United States Patent
Ishimoto et al.

(10) Patent No.: US 11,682,770 B2
(45) Date of Patent: Jun. 20, 2023

(54) CATALYST LAYER FOR FUEL CELL, MEMBRANE ELECTRODE ASSEMBLY, AND FUEL CELL

(71) Applicant: PANASONIC INTELLECTUAL PROPERTY MANAGEMENT CO., LTD., Osaka (JP)

(72) Inventors: Hitoshi Ishimoto, Hyogo (JP); Kazuya Yamasaki, Osaka (JP); Shinichiro Imura, Hyogo (JP); Takeshi Minamiura, Osaka (JP); Yukihiro Shimasaki, Hyogo (JP); Kenichi Ezaki, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 294 days.

(21) Appl. No.: 16/957,192

(22) PCT Filed: Dec. 26, 2018

(86) PCT No.: PCT/JP2018/047733
§ 371 (c)(1),
(2) Date: Jun. 23, 2020

(87) PCT Pub. No.: WO2019/131709
PCT Pub. Date: Jul. 4, 2019

(65) Prior Publication Data
US 2020/0335797 A1    Oct. 22, 2020

(30) Foreign Application Priority Data

Dec. 28, 2017 (JP) .............................. JP2017-254979
Mar. 20, 2018 (JP) .............................. JP2018-053387
Mar. 23, 2018 (JP) .............................. JP2018-056989

(51) Int. Cl.
*H01M 4/86* (2006.01)
*H01M 4/88* (2006.01)
(Continued)

(52) U.S. Cl.
CPC ....... *H01M 4/8673* (2013.01); *H01M 4/8657* (2013.01); *H01M 4/8807* (2013.01);
(Continued)

(58) Field of Classification Search
CPC ....... H01M 2008/1095; H01M 4/8657; H01M 4/8673; H01M 4/8807; H01M 4/92; H01M 4/921; H01M 8/1004; Y02E 60/50
See application file for complete search history.

(56) References Cited

U.S. PATENT DOCUMENTS

2003/0091891 A1* 5/2003 Yoshida .............. H01M 8/0243
429/534
2005/0250002 A1 11/2005 Stanley et al.
(Continued)

FOREIGN PATENT DOCUMENTS

CN        103270632 A    8/2013
CN        105073254 A    11/2015
(Continued)

OTHER PUBLICATIONS

Chinese Office Action issued in the corresponding Chinese Patent Application No. 201880083828.4, dated Dec. 20, 2021.
International Search Report and Written Opinion issued in International Patent Application No. PCT/JP2018/047733, dated Mar. 26, 2019; with partial English translation.

*Primary Examiner* — Victoria H Lynch
(74) *Attorney, Agent, or Firm* — McDermott Will & Emery LLP

(57) ABSTRACT

Disclosed is a catalyst layer for a fuel cell that has good gas diffusion properties in the entire catalyst layer and in which coarsening of catalyst particles can be suppressed. The catalyst layer for a fuel cell includes fibrous conductive
(Continued)

members and catalyst particles. The fibrous conductive members are inclined relative to the surface direction of the catalyst layer, and the length L of the fibrous conductive members and the thickness T of the catalyst layer satisfy the relational expression: $L/T \leq 3$. Each of the catalyst particles includes a core portion and a shell portion that covers the core portion, and contains a component different from that of the core portion.

20 Claims, 4 Drawing Sheets

(51) Int. Cl.
  *H01M 4/92* (2006.01)
  *H01M 8/1004* (2016.01)
  *H01M 8/10* (2016.01)
(52) U.S. Cl.
  CPC ............ *H01M 4/92* (2013.01); *H01M 4/921* (2013.01); *H01M 8/1004* (2013.01); *H01M 2008/1095* (2013.01)

(56) References Cited

U.S. PATENT DOCUMENTS

| | | | |
|---|---|---|---|
| 2008/0241641 | A1* | 10/2008 | Kurita ................ H01M 8/1004 156/276 |
| 2010/0075201 | A1* | 3/2010 | Nakanishi ............... H01M 4/92 429/434 |
| 2013/0266887 | A1 | 10/2013 | Norimoto |
| 2014/0302419 | A1 | 10/2014 | Nanba et al. |
| 2016/0013494 | A1 | 1/2016 | Arihara et al. |
| 2021/0143460 | A1 | 5/2021 | Ishimoto et al. |

FOREIGN PATENT DOCUMENTS

| | | |
|---|---|---|
| CN | 110383548 A | 10/2019 |
| JP | 2007-257886 A | 10/2007 |
| JP | 2011-218278 A | 11/2011 |
| JP | 2014-154350 A | 8/2014 |
| WO | 2008/068887 A1 | 6/2008 |
| WO | 2013/065396 A1 | 5/2013 |

* cited by examiner

CATALYST LAYER FOR FUEL CELL, MEMBRANE ELECTRODE ASSEMBLY, AND FUEL CELL

CROSS-REFERENCE OF RELATED APPLICATIONS

This application is the U.S. National Phase under 35 U.S.C. § 371 of International Patent Application No. PCT/JP2018/047733, filed on Dec. 26, 2018, which in turn claims the benefit of Japanese Application No. 2017-254979, filed on Dec. 28, 2017, Japanese Application No. 2018-053387, filed on Mar. 20, 2018, and Japanese Application No. 2018-056989, filed on Mar. 23, 2018, the entire disclosures of which Applications are incorporated by reference herein.

TECHNICAL FIELD

The present disclosure relates to a membrane electrode assembly and a fuel cell.

BACKGROUND ART

A fuel cell includes a membrane electrode assembly that includes an electrolyte membrane and a pair of electrodes that sandwich the electrolyte membrane. Each of the pair of electrodes includes a catalyst layer and a gas diffusion layer in this order from the electrolyte membrane side.

Patent Literature 1 proposes a membrane electrode assembly including: a catalyst layer that includes conductive nano columnar bodies (hereinafter referred to simply as "columnar bodies") that are oriented in a direction substantially perpendicular to the surface direction of the catalyst layer (electrolyte membrane) and a catalyst that is supported by the columnar bodies; and an embedding prevention layer that is provided between the catalyst layer and the electrolyte membrane.

The catalyst layer is formed by forming, on a substrate, columnar bodies that are oriented in a direction substantially perpendicular to the surface direction of the substrate by a chemical vapor deposition method, and transferring the columnar bodies formed on the substrate onto an electrolyte membrane. The embedding prevention layer is provided to suppress a reduction in catalyst utilization rate caused by the end portions of the columnar bodies being embedded into the electrolyte membrane as a result of the columnar bodies being transferred onto the electrolyte membrane.

Also, Patent Literature 1 discloses a gas diffusion layer including a water repellent layer that is formed on the catalyst layer-side surface of a sheet-like conductive porous substrate (hereinafter referred to simply as "substrate"), the water repellent layer containing a conductive material and a water repellent resin, and also discloses a gas diffusion layer that is impregnated with a water repellent resin on the catalyst layer side of the substrate. Patent Literature 1 discloses that the substrate may be carbon paper, a carbon cloth or the like, and have a thickness of 50 μm or more.

On the other hand, Patent Literature 2 proposes a membrane electrode assembly in which, as in Patent Literature 1, conductive nano columnar bodies and a catalyst supported by the columnar bodies are used, the columnar bodies being oriented at an inclination angle of 60° or less relative to the surface direction of the electrolyte membrane, and one ends of the columnar bodies being embedded into the electrolyte membrane.

CITATION LIST

Patent Literatures

[PTL 1] WO 2013/065396
[PTL 2] Laid-Open Patent Publication No. 2007-257886

SUMMARY OF INVENTION

During production of a membrane electrode assembly, a unit cell, or a stack body (cell stack) including a plurality of unit cells, an external force in the thickness direction of the membrane electrode assembly may be applied to the membrane electrode assembly. The columnar bodies of Patent Literature 1 are oriented in a direction substantially perpendicular to the surface direction of the catalyst layer (electrolyte membrane), and opposite end portions of the columnar bodies are in contact with the electrolyte membrane and the gas diffusion layer, respectively. Accordingly, if an external force in the thickness direction is applied, a problem may occur such as stress concentrating on the opposite end portions of the columnar bodies, which causes the columnar bodies to be bent and the end portions of the columnar bodies to penetrate into the electrolyte membrane and the gas diffusion layer. If such a problem occurs, voids (gas paths) are formed unevenly in the catalyst layer, and gas diffusion properties decrease in a portion of the catalyst layer. The columnar bodies of Patent Literature 2 are obliquely oriented relative to the surface direction of the electrolyte membrane, and the electrolyte membrane-side ends of the columnar bodies are embedded into the electrolyte membrane. As described above, if an external force in the thickness direction of the columnar bodies is applied, the stress applied to the columnar bodies is directly applied to the electrolyte membrane, causing damage to the electrolyte membrane. Furthermore, because the columnar bodies are oriented in an oblique direction, the stress concentrates on the side surface portions of the columnar bodies, causing the columnar bodies to be bent. If the columnar bodies are bent, the distance between adjacent columnar bodies is shortened, causing gas paths to be unevenly distributed and leading to a reduction in gas diffusion properties.

Catalyst particles are supported on the surface of a columnar body with less surface irregularities, and thus, the catalyst particles may move on the surface of the columnar body at the time of power generation, as a result of which, a plurality of catalyst particles aggregate together, and the catalyst particles coarsen. Coarsening of the catalyst particles results in significantly different catalyst particle sizes, and gas diffusion properties in the catalyst layer decrease, electric current concentrates locally, and the electrolyte membrane may degrade due to heat generated as a result of the local electric current. In addition, coarsening of the catalyst particles may change the covering state of the catalyst particle surface by a proton conductive resin, increasing the proton conductive resistance.

Also, the gas diffusion layer of Patent literature 1 includes the above-described substrate, and thus is less flexible. The gas diffusion layer described above does not easily conform to the surface of the catalyst layer, and thus the adhesion between the catalyst layer and the gas diffusion layer is low. Such a low adhesion between the catalyst layer and the gas diffusion layer has an influence on supply of a reactive gas from the gas diffusion layer to the catalyst layer and discharge of produced water from the catalyst layer to the gas diffusion layer.

If the catalyst layer and the gas diffusion layer are heat-pressed at a high pressure such that the catalyst layer and the gas diffusion layer closely adhere to each other during production of the membrane electrode assembly, as described above, the columnar bodies may be bent, and the end portions of the columnar bodies may penetrate into the gas diffusion layer and the like, as a result of which, the gas diffusion properties in the catalyst layer decrease.

One aspect of the present disclosure relates to a catalyst layer for a fuel cell including: fibrous conductive members; and catalyst particles, wherein a length L of the fibrous conductive members and a thickness T of the catalyst layer satisfy the relational expression: $L/T \leq 3$, and the fibrous conductive members are inclined relative to a surface direction of the catalyst layer.

Another aspect of the present disclosure relates to a fuel cell including: a membrane electrode assembly including an electrolyte membrane and a pair of electrodes that sandwich the electrolyte membrane, wherein at least one of the pair of electrodes includes the above-described catalyst layer.

Another aspect of the present disclosure relates to a catalyst layer for a fuel cell including: fibrous conductive members; and catalyst particles. The fibrous conductive members are inclined relative to the surface direction of the catalyst layer, and the catalyst particles include first particles, each including a core portion and a shell portion. The shell portion covers the core portion, and contains a component different from that of the core portion.

Another aspect of the present disclosure relates to a fuel cell including: a membrane electrode assembly including an electrolyte membrane and a pair of electrodes that sandwich the electrolyte membrane, wherein at least one of the pair of electrodes includes the above-described catalyst layer.

One aspect of the present disclosure relates to a membrane electrode assembly including: an electrolyte membrane; and a pair of electrodes that sandwich the electrolyte membrane. Each of the pair of electrodes includes a catalyst layer and a gas diffusion layer in this order from the electrolyte membrane side. The catalyst layer of the at least one of the pair of electrodes includes first fibrous conductive members and catalyst particles. The length $L_1$ of the first fibrous conductive members and the thickness $T_1$ of the catalyst layer satisfy the relational expression: $L_1/T_1 \leq 3$, and the first fibrous conductive members are inclined relative to the surface direction of the catalyst layer. The gas diffusion layer of the at least one of the pair of electrodes includes a porous layer that contains a conductive material and a polymer resin.

Another aspect of the present disclosure relates to a fuel cell including the above-described membrane electrode assembly and a pair of separators that sandwich the membrane electrode assembly.

According to the present disclosure, good gas diffusion properties in the entire catalyst layer can be obtained. As a result the output characteristics of the fuel cell can be enhanced.

Also, according to the present disclosure, good gas diffusion properties in the entire catalyst layer can be obtained, and coarsening of catalyst particles can be suppressed.

According to the present disclosure, good gas diffusion properties in the entire catalyst layer can be obtained, and the adhesion between the catalyst layer and the gas diffusion layer can be improved. As a result, the power generation performance of the fuel cell can be enhanced.

DESCRIPTION OF EMBODIMENTS

First Embodiment

Figure 1:
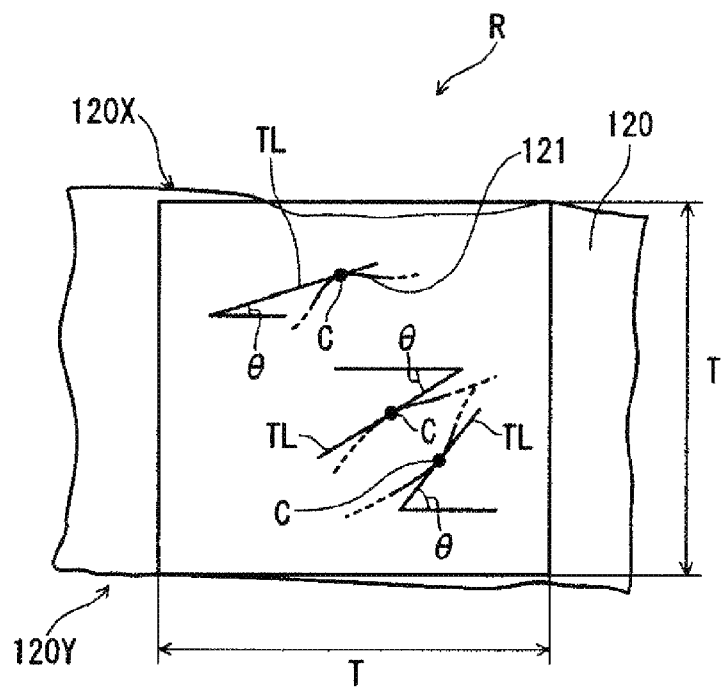
FIG. 1 is an illustrative diagram illustrating a method for calculating linearity parameter $L_p$ of fibrous conductive members and a method for calculating inclination angle θ of the fibrous conductive members, by using a cross section of a catalyst layer.

A catalyst layer for a fuel cell according to an embodiment of the present disclosure includes fibrous conductive members and catalyst particles. The fibrous conductive members are inclined relative to the surface direction of the catalyst layer (the surface perpendicular to the thickness direction of the catalyst layer). The catalyst particles include first particles (core shell particles), each including a core portion and a shell portion. The shell portion covers the core portion, and contains a component different from that of the core portion. Also, a fuel cell according to an embodiment of the present invention includes a membrane electrode assembly that includes an electrolyte membrane and a pair of electrodes that sandwich the electrolyte membrane. At least one of the pair of electrodes includes the above-described catalyst layer. In other words, the fibrous conductive members are inclined relative to the surface direction (the surface perpendicular to the thickness direction of the electrolyte membrane) of the electrolyte membrane. One of the pair of electrodes functions as an anode, and the other electrode functions as a cathode. Hereinafter, the surface direction of the catalyst layer and the surface direction of the electrolyte membrane will also be referred to as "XY direction". Likewise, the thickness direction of the catalyst layer and the thickness direction of the electrolyte membrane will also be referred to as "Z direction".

The expression "fibrous conductive members are inclined relative to the XY direction" means that the fibrous conductive members are neither parallel nor perpendicular to the XY direction. That is, it can be said that the fibrous conductive members are inclined relative to the XY direction, and also inclined relative to the Z direction.

As described above, because the fibrous conductive members are inclined relative to the XY direction, bending of the fibrous conductive members, penetration of the fibrous conductive members into the electrolyte membrane, and the like caused by an external force being applied to the membrane electrode assembly (catalyst layer) in the Z direction can be suppressed. Accordingly, the reduction in gas diffusion properties in a portion of the catalyst layer caused by bending of the fibrous conductive members, penetration of the fibrous conductive members into the electrolyte membrane, and the like can be suppressed, and thus good gas diffusion properties in the entire catalyst layer can be obtained. Furthermore, the possibility of an influence on the conductivity of the fibrous conductive members caused by bending of the fibrous conductive members, penetration of the fibrous conductive members into the electrolyte membrane, and the like is also eliminated. Accordingly, even without an embedding prevention layer, embedment of the end portions of the fibrous conductive members into the electrolyte membrane during transfer of the catalyst layer onto the electrolyte membrane can be suppressed.

The expression "fibrous conductive members are inclined" means that the fibrous conductive members are present inclined relative to the XY direction in the catalyst layer, with the linearity of the fibrous conductive members being ensured. As used herein, the expression "the linearity of the fibrous conductive members is ensured" means that the fibrous conductive members are not bent significantly, and linearity parameter $L_p$ (average value) which is determined using a method described below, is 0.6 or more. From the viewpoint of further improving gas diffusion properties, the linearity parameter $L_p$ (average value) is preferably 0.7 or more.

The direction in which the fibrous conductive members are inclined in the catalyst layer is not particularly limited. A plurality of fibrous conductive members included in the catalyst layer may be inclined in different directions, or may be inclined unidirectionally.

The core portion and the shell portion of each first particle contain different components. As used herein, the expression "the core portion and the shell portion contain different components" means that a metal element that accounts for the highest proportion of the core portion and a metal element that accounts for the highest proportion of the shell portion are different. When the first particles move on the surface of a fibrous conductive member at the time of power generation, aggregation of metals proceeds. However, aggregation proceeds easily between metals of the same kind, and thus the core portions and the shell portions tend to aggregate separately. Accordingly, an aggregation formed by a plurality of catalyst particles being held together as a whole can be suppressed, and coarsening of the catalyst particles can be suppressed. Thus, significant particle size differences are unlikely to occur, and local electric current concentration in the catalyst layer and generation of heat caused by the local electric current concentration are unlikely to occur, as a result of which, degradation of the electrolyte membrane can be suppressed.

Ordinarily, the surface of a catalyst particle is covered by a proton conductive resin. If coarsening of catalyst particles is suppressed, the covering state of the surface of each catalyst particle by the proton conductive resin does not easily change, and thus an increase in proton conductive resistance is also suppressed.

When the fibrous conductive members are inclined relative to the XY direction, it is considered that gas diffusion properties in the entire catalyst layer are improved, and thus the catalyst particles can more easily move at the time of power generation, which further facilitates coarsening of the catalyst particles. In contrast, when core shell particles are used as the catalyst particles, the core portions and the shell portions aggregate separately, and thus even if gas diffusion properties in the entire catalyst layer are improved significantly, coarsening of the catalyst particles can be suppressed significantly. As described above, good gas diffusion properties in the entire catalyst layer can be obtained, and coarsening of the catalyst particles can be suppressed, as a result of which, the power generation performance (output characteristics, and the like) of the fuel cell can be improved. In other words, in the case where the fibrous conductive members are inclined relative to the XY direction, suppression of coarsening of the catalyst particles being core shell particles is more pronounced.

The average particle size of the first particles is preferably, for example, 2 nm or more and 10 nm or less, and more preferably 3 nm or more and 8 nm or less. If the average particle size of the first particles is 2 nm or more, the catalytic activity can be sufficiently ensured. If the average particle size of the first particles is 10 nm or less, the electrochemically effective area per gram of the catalyst particles is sufficiently increased. In particular, if the average particle size of the first particles is 3 nm or more and 8 nm or less, the catalytic activity can be sufficiently ensured, and the sizes of second particles and third particles that can be formed by movement of the first particles, which will be described later, can be sufficiently reduced.

The average particle size of the first particles can be determined in the manner described below after disassembling an unused fuel cell and removing the membrane electrode assembly (catalyst layer) from the fuel cell.

In an image captured by a transmission electron microscope (TEM), a single first particle is arbitrarily selected, and the particle size of the first particle is calculated assuming that the first particle has a spherical shape. Likewise, the particle size of each of 200 to 300 first particles observed in the TEM image is calculated in the same manner. The average value of the particle sizes is defined as the average particle size of the first particles. Whether the catalyst particles that are present in the catalyst layer are first particles (core shell particles) can be checked through composition analysis using energy dispersive X-ray spectroscopy (EDX).

As the component that constitutes the shell portion, any component can be used as long as it is catalytically active. From the viewpoint of ensuring a high level of catalytic activity, the shell portion preferably contains at least one of platinum and a platinum alloy. The platinum alloy contains platinum as the main component. As used herein, the term "main component" means that the amount of platinum in the platinum alloy is 90 mass % or more and less than 100 mass %. If the amount of platinum in the platinum alloy is 90 mass % or more, high levels of catalytic activity and durability can be obtained. The platinum alloy may contain, other than platinum, for example, at least one selected from the group consisting of iridium, ruthenium, rhodium, nickel, gold, cobalt, palladium, silver, iron, and copper.

The core portion contains, for example, a transition metal other than platinum. Examples of the transition metal other than platinum include palladium, copper, iron, nickel, cobalt, ruthenium, rhodium, silver, and gold. Among the transition metals other than platinum, from the viewpoint of cost reduction, it is preferable to use copper, iron and nickel. However, copper, iron and nickel easily leach out from the core portion, and it is therefore desirable that the transition metal other than platinum is selected as appropriate according to the environment of use. Various metals listed above may be used singly or in a combination of two or more. In the case where the metals are used in a combination of two or more, they may be used as an alloy.

From the viewpoint of suppressing coarsening of the catalyst particles and stabilizing the shell portions, the core portions preferably contain at least one of palladium and a palladium alloy. The palladium alloy contains palladium as the main component. As used herein, the term "main component" means that the amount of palladium in the palladium alloy is 80 mass % or more and less than 100 mass %. If the amount of palladium in the palladium alloy is 80 mass % or more, coarsening of the catalyst particles can be further suppressed. In addition, if the amount of palladium in the palladium alloy is 80 mass % or more, the difference in atomic size relative to platinum contained in the shell portions is small, and thus uniform shell portions can be easily obtained. The palladium alloy contains, other than palladium, for example, at least one selected from the group consisting of iridium, copper, iron, nickel, cobalt, ruthenium, rhodium, and silver.

From the viewpoint of ensuring a high level of catalytic activity and suppressing coarsening of the catalyst particles, the mass proportion of the shell portions of the first particles is preferably 30 parts by mass or more and 400 parts by mass or less relative to 100 parts by mass of the core portions, and more preferably 40 parts by mass or more and 200 parts by mass or less relative to 100 parts by mass of the core portions. It is also preferable that each shell portion has a thickness that corresponds to 1 to 4 atoms that constitute the shell portion.

It is preferable that 70% or more of the surface of the core portion is covered by the shell portion, and it is more preferable that 80% or more of the surface of the core portion is covered by the shell portion. If 70% or more of the surface of the core portion is covered by the shell portion, a high level of catalytic activity can be sufficiently ensured.

The catalyst particles may further include second particles that contain the same component as that of the core portions. Such second particles may be formed by aggregation of core portions caused by movement of a plurality of first particles at the time of power generation. Due to formation of second particles, the size of aggregated particles can be reduced as compared with the case where a plurality of catalyst particles aggregate as a whole. As used herein, the expression "the second particles contain the same component as that of the core portions" means that a metal element that accounts for the highest proportion of the second particles and a metal element that accounts for the highest proportion of the core portions are the same.

The catalyst particles may further include third particles that contain the same component as that of the shell portions. Such third particles may be formed by aggregation of shell portions caused by movement of the first particles at the time of power generation. Due to formation of third particles, the size of aggregated particles can be reduced as compared with the case where a plurality of catalyst particles aggregate as a whole. As used herein, the expression "the third particles contain the same component as that of the shell portions" means that a metal element that accounts for the highest proportion of the third particles and a metal element that accounts for the highest proportion of the shell portions are the same.

The second particles and the third particles are derived from the first particles, but they can be distinguished from the first particles in that they do not have a core shell structure.

It is preferable that the length L of the fibrous conductive members and the thickness T of the catalyst layer satisfy the relational expression: L/T≤3. If L/T is 3 or less, fibrous conductive members that are inclined relative to the XY direction while ensuring an appropriate level of linearity of the fibrous conductive members can be easily obtained. With this configuration, voids (gas paths) can be sufficiently formed in the catalyst layer, and gas can be effectively diffused in the entire catalyst layer.

From the viewpoint of further improving gas diffusion properties in the catalyst layer, L/T is preferably 0.25 or more and 2.0 or less, and more preferably 0.25 or more and 1.0 or less. In this case, the fibrous conductive members can be easily inclined at an inclination angle θ within a preferred range, which will be described later.

The length L of the fibrous conductive members means average fiber length, and can be determined by arbitrarily extracting 10 fibrous conductive members from the catalyst layer and averaging the fiber lengths of the fibrous conductive members. The term "the fiber length of a fibrous conductive member" refers to the length of a straight line connecting one end and the other end of the fibrous conductive member.

The length L of the fibrous conductive members is preferably 0.2 μm or more and 20 μm or less, and more preferably 0.5 μm or more and 10 μm or less. In this case, even if a thin catalyst layer (for example, with a thickness T of 10 μm or less) is used, the fibrous conductive members can be easily inclined relative to the surface direction of the catalyst layer. By using short fibrous conductive members that have a length within the above-described range, opposite ends of the fibrous conductive members in the catalyst layer respectively coming into contact with the electrolyte membrane and the gas diffusion layer can be suppressed. As a result, the embedment of the end portions of the fibrous conductive members into the electrolyte membrane during transfer of the catalyst layer onto the electrolyte membrane and the penetration of the fibrous conductive members into the electrolyte membrane and the like in the event of an external force being applied to the membrane electrode assembly in the thickness direction thereof can be further suppressed.

The thickness T of the catalyst layer means average thickness, and can be determined by measuring the distance of a straight line connecting one main surface to the other main surface of the catalyst layer in the thickness direction of the catalyst layer at arbitrarily selected 10 points in a cross section of the catalyst layer, and averaging the obtained distances.

From the viewpoint of size reduction of the fuel cell, it is desirable that the thickness T of the catalyst layer is small. On the other hand, from the viewpoint of strength, it is preferable that the thickness T of the catalyst layer is not too small. The thickness T of the catalyst layer is, for example, 1 μm or more and 50 μm or less, and preferably 2 μm or more and 20 μm or less.

The inclination angle θ of the fibrous conductive members relative to the surface direction of the catalyst layer is preferably 80° or less, and more preferably 70° or less. If the inclination angle θ is 800 or less, gas diffusion properties in the surface direction of the catalyst layer are further improved in addition to gas diffusion properties in the thickness direction of the catalyst layer. If the inclination angle θ is 70° or less, the bending of the fibrous conductive members and the penetration of the fibrous conductive members into the electrolyte membrane and the like in the event of an external force being applied to the membrane electrode assembly in the thickness direction thereof can be further suppressed.

Also, the inclination angle θ of the fibrous conductive members relative to the surface direction of the catalyst layer is preferably 25° or more. If the inclination angle θ is 25 or more, the gas diffusion properties in the thickness direction of the catalyst layer are further improved in addition to the gas diffusion properties in the surface direction of the catalyst layer.

More preferably, the inclination angle θ is 25° or more and 65° or less.

The linearity parameter $L_p$ and the inclination angle θ of the fibrous conductive members are determined in the manner described below by using FIG. 1. FIG. 1 is an illustrative diagram illustrating a method for calculating linearity parameter L of fibrous conductive members and a method for calculating inclination angle θ of the fibrous conductive members, by using a cross section of a catalyst layer 120. FIG. 1 shows only a few fibrous conductive members 121.

First, an image of a cross section of a catalyst layer 120 taken along the thickness direction of the catalyst layer 120 is captured using a scanning electron microscope (SEM). The catalyst layer 120 contains fibrous conductive members 121 and catalyst particles (not shown), and has a first main surface 120X on the gas diffusion layer side and a second main surface 120Y on the electrolyte membrane side.

In an obtained SEM image, for example, a square region (hereinafter referred to as "designated region R") is defined, the square region being a square region in which, for example, 20 or more fibrous conductive members 121 can be observed and that has each side having a length corresponding to the thickness T of the catalyst layer 120. The designated region R can be defined in the manner described below. First, a straight line is drawn along the thickness direction of the catalyst layer 120. A point of intersection of the straight line with the second main surface 120Y is taken as one of the vertices of a square that will be the designated region R. Next, two straight lines that each have a length T and are perpendicular to each other are drawn from this vertex, and other two straight lines are drawn so as to form a square together with the two straight lines drawn earlier.

Next, 10 fibrous conductive members are arbitrarily selected from among the fibrous conductive members 121 that can be observed in the designated region R. For each of the 10 fibrous conductive members 121, one end and the other end of an observable lengthwise portion are connected by a straight line, and the length $L_s$ of the straight line is obtained. Also, the actual length $L_r$ of the observable lengthwise portion is obtained. The ratio of $L_s$ relative to $L_r$ ($L_s/L_r$) is defined as linearity parameter $L_p$.

In the manner as described above, the designated regions R are defined such that they do not overlap each other. Then, for each of the three designated regions R, the linearity parameters $L_p$ of 10 fibrous conductive members 121 are obtained, and the average value of the linearity parameters $L_p$ of a total of 30 fibrous conductive members 121 is obtained. If the linearity parameter $L_p$ (average value) is 0.6 or more, it is determined that the linearity of the fibrous conductive members 121 is ensured. On the other hand, if the linearity parameter $L_p$ (average value) is less than 0.6, it is determined that the fibrous conductive members 121 are bent, and inclination angle θ, which will be described later, cannot be obtained.

After it has been confirmed from the above-described linearity parameter that the linearity of the fibrous conductive members is ensured, the inclination angle θ of the fibrous conductive members is determined in the manner described below by using FIG. 1.

For each of the 10 fibrous conductive members 121 arbitrarily selected in each of the three designated regions R, a tangent line TL is drawn at the midpoint C of an observable lengthwise portion. The angle (90° or less) formed by the tangent line TL and the first main surface 120X is defined as the inclination angle θ of the fibrous conductive member 121, and the average value of the inclination angles θ of a total of 30 fibrous conductive members 121 is determined. If the first main surface 120X has irregularities, a surface perpendicular to the thickness direction of the catalyst layer 120 or the smooth second main surface 120Y may be used as a reference for determining the inclination angle θ.

The diameter D of the fibrous conductive members is preferably 200 nm or less, more preferably 5 nm or more and 200 nm or less, and even more preferably 8 nm or more and 100 nm or less. In this case, the volume ratio of the fibrous conductive members in the catalyst layer can be reduced, the gas paths can be sufficiently ensured, and the gas diffusion properties can be further enhanced.

The diameter D of the fibrous conductive members can be determined by arbitrarily selecting 10 fibrous conductive members from among the fibrous conductive members in the catalyst layer and averaging the diameters of the 10 fibrous conductive members. The term "diameter" refers to the length of a fibrous conductive member in a direction perpendicular to the lengthwise direction of the fibrous conductive member.

It is preferable that the length L of the fibrous conductive members and the diameter D of the fibrous conductive members satisfy the relational expression: D/L<1. In this case, good gas diffusion properties can be sufficiently obtained in the entire catalyst layer.

From the viewpoint of improving conductivity, it is more preferable that D/L is 0.002 or more and less than 1.

From the viewpoint of improving gas diffusion properties in the catalyst layer, it is preferable that the fibrous conductive members have a BET specific surface area of 50 $m^2/g$ or more. In this case, a predetermined spacing or more can be ensured between catalyst particles that are present on each fibrous conductive member, and thus gas diffusion properties around the catalyst particles can be ensured.

The BET specific surface area of the fibrous conductive members is obtained in the manner described below.

From a sample obtained by cutting out a portion from a produced catalyst layer, the catalyst particles and the proton conductive resin are removed, and the fibrous conductive members are extracted. The specific surface area of the fibrous conductive members is determined based on a BET method that is an ordinary method for measuring specific surface area, using a specific surface area measurement apparatus by a gas adsorption method.

Examples of the fibrous conductive members 121 include carbon fibers such as vapor grown carbon fibers (VGCFs), carbon nanotubes (CNTs), and carbon nanofibers.

At least some of the catalyst particles are supported by the fibrous conductive members. It is preferable that the catalyst particles are also supported by particulate conductive members, which will be described later, in addition to the fibrous conductive members. The reason is that the catalyst particles can more easily come into contact with the gas, which increases the efficiency of oxidation reaction or reduction reaction of the gas.

The catalyst particles are not particularly limited, and may be made of a catalyst metal such as an allay or a metal element selected from Sc, Y, Ti, Zr, V, Nb, Fe, Co, Ni, Ru, Rh, Pd, Pt, Os, Ir, lanthanoid-series elements, and actinoid-series elements. For example, the catalyst particles used in the anode may be made of Pt, a Pt—Ru alloy, or the like. The catalyst metal used in the cathode may be Pt, a Pt—Co alloy, or the like.

From the viewpoint of shortening the conductive path and further enhancing conductivity, it is preferable that the catalyst layer further contains particulate conductive members. The material of the particulate conductive members is not particularly limited, and it is preferable to use carbon black because it has excellent conductivity. Examples of carbon black include acetylene black, Ketjen black, thermal black, furnace black, channel black, and the like. The particle size (or the length of a structure composed of a plurality of connected primary particles) is not particularly limited, and any particle size that is conventionally used in a catalyst layer for a fuel cell can be used.

The amount of the particulate conductive members in the catalyst layer is preferably 40 parts by mass or less relative to 100 parts by mass of a total of the fibrous conductive members and the particulate conductive members, more preferably 5 parts by mass or more and 35 parts by mass or less, and even more preferably 10 parts by mass or more and 30 parts by mass or less. In this case, conductivity can be enhanced while ensuring good gas diffusion properties in the entire catalyst layer.

From the viewpoint of improving reactivity in the catalyst layer, it is preferable that the catalyst layer further contains a proton conductive resin. In this case, the proton conductive resin covers at least some of the fibrous conductive members and the catalyst particles. The fibrous conductive members are inclined relative to the surface direction of the catalyst layer, and thus an influence on the reactivity (proton conductivity) in the catalyst layer caused by the fibrous conductive members being bent due to an external force being applied in the thickness direction of the membrane electrode assembly can be suppressed.

The proton conductive resin is not particularly limited, and examples include a perfluorocarbon sulfonic acid-based polymer, a hydrocarbon-based polymer, and the like. Among these, it is preferable to use a perfluorocarbon sulfonic acid-based polymer or the like because it has excellent thermal resistance and chemical stability. As the perfluorocarbon sulfonic acid-based polymer, for example, Nafion® is used. The proton conductive resin may also cover at least some of the particulate conductive members.

The amount of the fibrous conductive members in the catalyst layer is preferably 15 parts by mass or more and 65 parts by mass or less relative to 100 parts by mass of a total of the catalyst particles, the particulate carbon material and the proton conductive resin, and more preferably 20 parts by mass or more and 55 parts by mass or less. The reason is that, within this range, the fibrous conductive members can be easily brought into a desired state, and gas diffusion properties and the efficiency of electrochemical reaction can be easily increased.

The catalyst layer can be formed by, for example, applying a catalyst ink containing the fibrous conductive members and the catalyst particles onto the surface of an electrolyte membrane, and drying the catalyst ink. Alternatively, the catalyst layer may be formed by applying the catalyst ink onto a transfer substrate sheet, then drying the catalyst ink to form a catalyst layer, and transferring the catalyst layer formed on the substrate sheet onto an electrolyte membrane. Because the fibrous conductive members are inclined relative to the surface direction of the catalyst layer, even without an embedding prevention layer being provided on the surface of the electrolyte membrane, the embedment of the fibrous conductive members into the electrolyte membrane during transfer of the catalyst layer can be suppressed. As the substrate sheet, it is preferable to use, for example, a sheet with a smooth surface made of polyethylene terephthalate (PET), polypropylene, or the like.

The catalyst ink contains a dispersion medium in addition to the fibrous conductive members and the catalyst particles. As the dispersion medium, for example, water, ethanol, propanol, and the like can be used. The catalyst ink may further contain particulate conductive members, a proton conductive resin, and the like.

As the application method, for example, a spray method, a screen printing method, or a coating method that uses any type of coater such as a blade coater, a knife coater, or a gravure coater can be used. In the case where a coater is used, the direction in which the fibrous conductive members are inclined can be easily controlled.

The fibrous conductive members that are inclined relative to the surface direction of the catalyst layer (electrolyte membrane) can be obtained by adjusting the length of the fibrous conductive members and the thickness of the catalyst layer such that L/T satisfies 3 or less when forming the catalyst layer by applying the catalyst ink. The length of the fibrous conductive members can be adjusted by selecting the length of the material for making the fibrous conductive members as appropriate. The thickness of the catalyst layer can be adjusted by changing the application amount of the catalyst ink or the like.

The inclination angle $\theta$ of the fibrous conductive members can be adjusted by changing, for example, the composition, viscosity, application amount, application rate, drying rate, and the like of the catalyst ink.

As the electrolyte membrane, a polymer electrolyte membrane is preferably used. As the material of the polymer electrolyte membrane, the polymer electrolytes listed as examples of the proton conductive resin can be used. The thickness of the electrolyte membrane is, for example, 5 to 30 µm.

The gas diffusion layer may have a structure with a substrate layer or a structure without a substrate layer. The structure with a substrate layer may be, for example, a structure that includes a substrate layer and a micro-porous layer that is provided on the catalyst layer-side surface of the substrate layer. As the substrate layer, a conductive porous sheet such as a carbon cloth or carbon paper can be used. The micro-porous layer may be made of a mixture of a water repellent resin such as fluorocarbon resin, a conductive carbon material and a proton conductive resin (polymer electrolyte), and the like.

Figure 2:
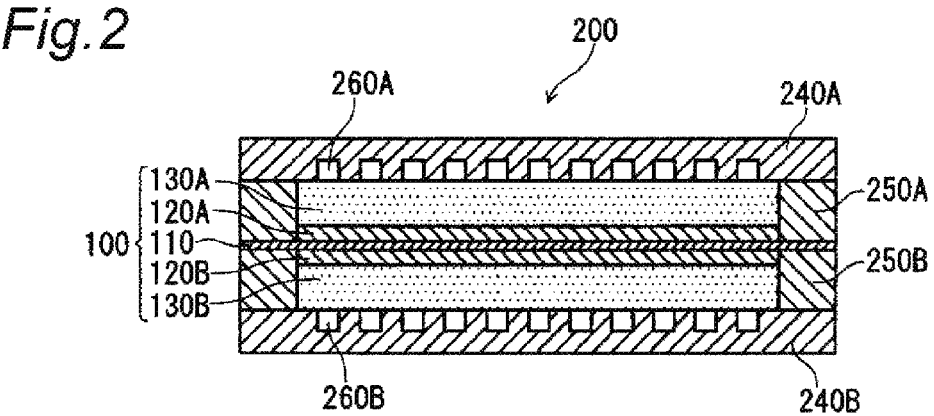
FIG. 2 is a cross sectional view schematically showing the structure of a unit cell included in a fuel cell according to a first embodiment of the present disclosure.

Hereinafter, an example of the structure of a fuel cell according to the present embodiment will be described with reference to FIG. 2. FIG. 2 is a cross sectional view schematically showing the structure of a unit cell provided in the fuel cell according to the embodiment of the present invention. Ordinarily, a plurality of unit cells are stacked and provided in a fuel cell as a cell stack. For the sake of convenience, FIG. 2 shows only one unit cell.

A unit cell provided in a fuel cell 200 includes: an electrolyte membrane 110; and a first catalyst layer 120A and a second catalyst layer 120B that are disposed to sandwich the electrolyte membrane 110. The unit cell of the fuel cell 200 further includes: a first gas diffusion layer 130A and a second gas diffusion layer 130B that are disposed to sandwich the electrolyte membrane 110 via the first catalyst layer 120A and the second catalyst layer 120B, respectively; and a first separator 240A and a second separator 240B that are disposed to sandwich the electrolyte membrane 110 via the first gas diffusion layer 130A and the second gas diffusion layer 130B, respectively. One of the first catalyst layer 120A and the second catalyst layer 120B functions as an anode, and the other catalyst layer functions as a cathode. The electrolyte membrane 110 is larger in size than the first catalyst layer 120A and the second catalyst layer 120B, and thus the peripheral portion of the electrolyte membrane 110 extends beyond the first catalyst layer 120A and the second catalyst layer 120B. The peripheral portion of the electrolyte membrane 110 is sandwiched by a pair of sealing members 250A and 250B.

Figure 3:
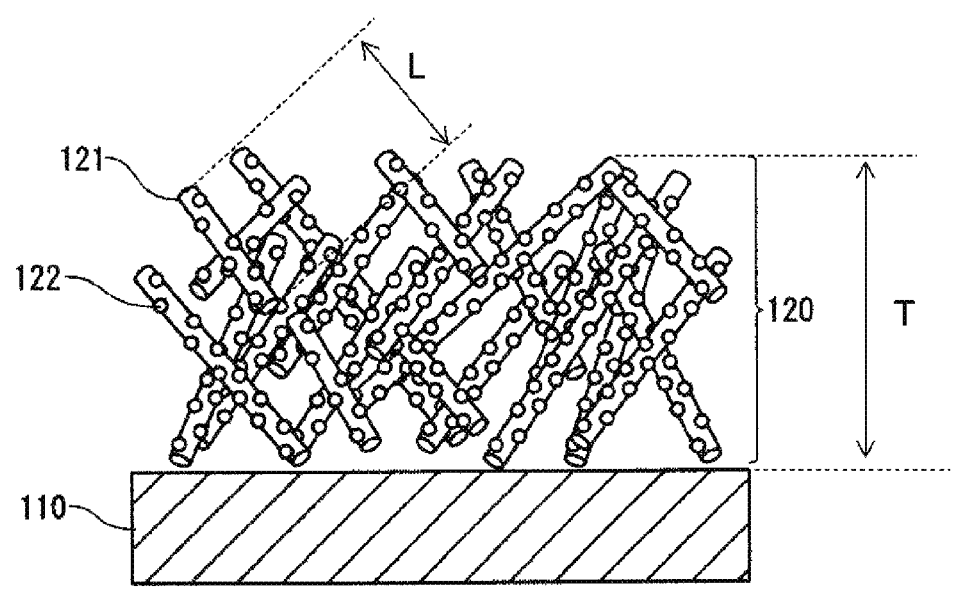
FIG. 3 is a diagram schematically showing the inside of a catalyst layer according to the first embodiment of the present disclosure.

At least one of the first catalyst layer 120A and the second catalyst layer 120B is a catalyst layer 120 shown in FIG. 3. FIG. 3 is a diagram schematically showing the inside of the catalyst layer, as viewed from the surface direction. In order to show that fibrous conductive members are inclined, for the sake of convenience, an electrolyte membrane 110 is also illustrated. As shown in FIG. 3, the catalyst layer 120 includes fibrous conductive members 121 and catalyst particles 122. The fibrous conductive members 121 are inclined relative to the surface direction of the electrolyte membrane 110, and the length L of the fibrous conductive members 121 and the thickness T of the catalyst layer 120 satisfy the relational expression: $L/T \leq 3$. If the other one of the first catalyst layer 120A and the second catalyst layer 120B is not the above-described catalyst layer 120, a catalyst layer of a known material and a known configuration can be used.

At least one the first gas diffusion layer 130A and the second gas diffusion layer 130B is the gas diffusion layer described above. The first gas diffusion layer 130A and the second gas diffusion layer 130B both may have the same configuration as that of the gas diffusion layer described above.

It is sufficient that the first separator 240A and the second separator 240B are gas-tight, electron conductive and electrochemically stable, and the material of the first separator 240A and the second separator 240B is not particularly limited. As the material, it is preferable to use a carbon material, a metal material, and the like. The metal material may be covered by carbon. Each of the first separator 240A and the second separator 240B can be obtained by, for example, punching out a metal plate into a predetermined shape and performing a surface treatment on the obtained metal plate.

In the present embodiment, a gas flow path 260A is formed on a surface of the first separator 240A that is in contact with the first gas diffusion layer 130A. On the other hand, on a surface of the second separator 240B that is in contact with the second gas diffusion layer 130B, a gas flow path 260B is formed. The shape of the gas flow paths is not particularly limited, and may be parallel, serpentine, or the like.

The sealing members 250A and 250B are made of an elastic material, and are provided to prevent a fuel and/or an oxidant from leaking out of the gas flow paths 260A and 260B. The sealing members 250A and 250B have, for example, frame-like shapes that respectively surround the peripheral portion of the first catalyst layer 120A and the peripheral portion of the second catalyst layer 120B in the shape of a loop. As the sealing members 250A and 250B, a known material and a known configuration can be used.

Figure 4:
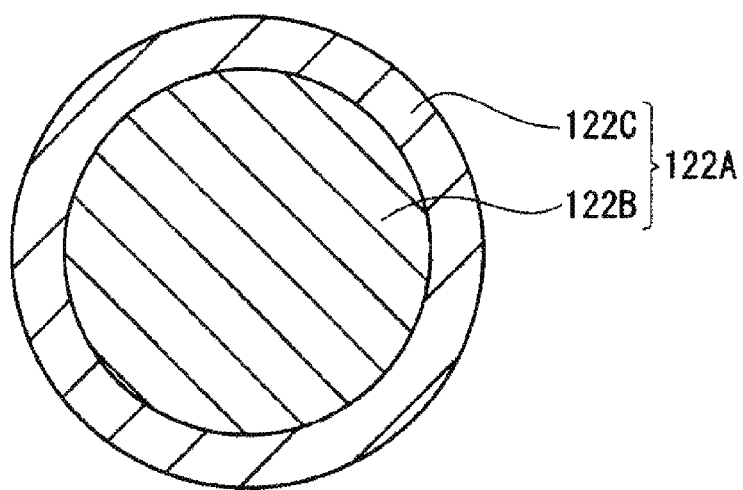
FIG. 4 is a cross sectional view schematically showing a first particle included in catalyst particles shown in FIG. 3.

The catalyst particles 122 include first particles 122A as shown in FIG. 4. FIG. 4 is across sectional view schematically showing a first particle 122A. The first particle 122A includes: a core portion 122B; and a shell portion 122C that covers the core portion 122B, and contains a component different from that of the core portion 122B. The catalyst particles 122 may further include the second particles and the third particles described above. If either one of the first catalyst layer 120A and the second catalyst layer 120B is not the above-described catalyst layer 120, a catalyst layer of a known material and a known configuration can be used.

At least one of the first gas diffusion layer 130A and the second gas diffusion layer 130B is the gas diffusion layer described above. The first gas diffusion layer 130A and the second gas diffusion layer 130B both may have the same configuration as that of the gas diffusion layer described above.

It is sufficient that the first separator 240A and the second separator 240B are gas-tight, electron conductive and electrochemically stable, and the material of the first separator 240A and the second separator 240B is not particularly limited. As the material, it is preferable to use a carbon material, a metal material, and the like. The metal material may be covered by carbon. For example, each of the first separator 240A and the second separator 240B can be obtained by, for example, punching out a metal plate into a predetermined shape and performing a surface treatment on the obtained metal plate.

In the present embodiment, a gas flow path 260A is formed on a surface of the first separator 240A that is in contact with the first gas diffusion layer 130A. On the other hand, on a surface of the second separator 240B that is in contact with the second gas diffusion layer 130B, a gas flow path 260B is formed. The shape of the gas flow paths is not particularly limited, and may be parallel, serpentine, or the like.

The sealing members 250A and 250B are made of an elastic material, and are provided to prevent a fuel and/or an oxidant from leaking out of the gas flow paths 260A and 260B. The sealing members 250A and 250B have, for example, frame-like shapes that respectively surround the peripheral portion of the first catalyst layer 120A and the peripheral portion of the second catalyst layer 120B in the shape of a loop. As the sealing members 250A and 250B, a known material and a known configuration can be used.

Hereinafter, the invention according to the present disclosure will be described in further detail by way of examples. However, the invention according to the present disclosure is not limited to the examples given below.

Example 1

<Production of Membrane Electrode Assembly>

Fibrous conductive members supporting catalyst particles (Pt) were added to an appropriate amount of water and dispersed by stirring. CNTs (with an average diameter of 15 nm and an average fiber length of 15 µm) were used as the fibrous conductive members. At this time, the amount of the catalyst particles was 50 parts by mass, and the amount of the fibrous conductive members was 50 parts by mass relative to 100 parts by mass of a total of the catalyst particles and the fibrous conductive members. Next, an appropriate amount of ethanol was added to the obtained dispersion while stirring the dispersion, and thereafter, 30 parts by mass of proton conductive resin (Nafion®) was added to 50 parts by mass of the fibrous conductive members. The resulting mixture was stirred, and thereby, a catalyst ink for forming a cathode catalyst layer was obtained.

Particulate conductive members (acetylene black) supporting catalyst particles (Pt) were added to an appropriate amount of water and dispersed by stirring. At this time, the amount of the catalyst particles was 50 parts by mass, and the amount of the particulate conductive members was 50 parts by mass relative to 100 parts by mass of a total of the catalyst particles and the particulate conductive members. Next, an appropriate amount of ethanol was added to the obtained dispersion while stirring the dispersion, and thereafter 40 parts by mass of proton conductive resin (Nafion®) was added to 50 parts by mass of the particulate conductive members. The resulting mixture was stirred, and thereby, a catalyst ink for forming an anode catalyst layer was obtained.

A Nafion® membrane (with a thickness of 15 μm) was prepared as an electrolyte membrane. The catalyst ink for forming a cathode catalyst layer was applied to the cathode-side main surface of the electrolyte membrane by spraying, and was dried in an atmosphere at 70° C. for 3 minutes. In this way, a cathode catalyst layer was formed. The application amount of the catalyst ink for forming a cathode catalyst layer was adjusted such that the thickness of the cathode catalyst layer was 6 μm. Next, the catalyst ink for forming an anode catalyst layer was applied to the anode-side main surface of the electrolyte membrane by spraying, and was dried in an atmosphere at 70° C. for 3 minutes. In this way, an anode catalyst layer was formed.

Two conductive porous sheets, each having a micro-porous layer (MPL) on one main surface thereof, were prepared as gas diffusion layers. One of the gas diffusion layers was disposed on a main surface of the anode catalyst layer that was on the opposite side of the electrolyte membrane such that the micro-porous layer faced the anode catalyst layer. The other gas diffusion layer was disposed on a main surface of the cathode catalyst layer that was on the opposite side of the electrolyte membrane such that the micro-porous layer faced the cathode catalyst layer. After that, the electrolyte membrane, and the pair of catalyst layers and the pair of gas diffusion layers sandwiching the electrolyte membrane were formed into a unitary body by heat-pressing. In this way, a membrane electrode assembly was produced. Frame-shaped sealing members were disposed to surround the anode and the cathode, respectively.

An image of a cross section of the obtained membrane electrode assembly was captured using a SEM. In the SEM image, it was confirmed that some catalyst particles were supported by fibrous conductive members. The thickness T of the cathode catalyst layer obtained by the above-described method using the SEM image was 6 μm. The length L of the fibrous conductive members obtained by using the above-described method was 15 μm, and the diameter D of the fibrous conductive members was 15 nm. From this, L/T was calculated to be 15/6.

The linearity parameter $L_p$ obtained by using the above-described method was 0.6 or more, from which it was confirmed that the linearity of the fibrous conductive members was ensured. The inclination angle θ of the fibrous conductive members relative to the surface direction of the cathode catalyst layer obtained by using the above-described method was 30°, from which it was confirmed that the fibrous conductive members were not lying down. In the SEM image, it was also confirmed that the fibrous conductive members were not penetrating into the electrolyte membrane and the gas diffusion layer.

<Production of Unit Cell>

A membrane electrode assembly was entirely sandwiched by a pair of flat stainless steel plates (separators), and a test unit cell A1 was thereby obtained. A gas flow path was formed on a surface of each separator to be in contact with a gas diffusion layer.

<Evaluation>

The unit cell A1 of Example 1 was subjected to I-V characteristics measurement under conditions of a cell temperature of 80° C., a gas utilization rate of 50%, and a relative humidity of 100% so as to obtain peak power density. The peak power density is indicated as an index, with the peak power density of a unit cell B1 of Comparative Example 1 being set to 100.

Example 2

A unit cell A2 was produced in the same manner as in Example 1, except that CNTs with an average fiber length of 5 μm were used as fibrous conductive members, and the obtained unit cell was evaluated. The length L of the fibrous conductive members obtained by using the above-described method was 5 μm, and the thickness T of the cathode catalyst layer was 6 μm. From this, L/T was calculated to be 5/6.

The linearity parameter $L_p$ obtained by using the above-described method was 0.6 or more, from which it was confirmed that the linearity of the fibrous conductive members was ensured. The inclination angle θ of the fibrous conductive members relative to the surface direction of the cathode catalyst layer obtained by using the above-described method was 45°, from which it was confirmed that the fibrous conductive members were not lying down. In the SEM image, it was also confirmed that the fibrous conductive members were not penetrating into the electrolyte membrane and the gas diffusion layer.

Example 3

Likewise, a unit cell A3 was produced in the same manner as in Example 1, except that CNTs with an average fiber length of 15 μm were used as fibrous conductive members, and the obtained unit cell was evaluated. The length L of the fibrous conductive members obtained by using the above-described method was 100 μm, and the thickness T of the catalyst layer was 5 μm. From this, L/T was calculated to be 15/5 (L/T=3).

The linearity parameter $L_p$ obtained by using the above-described method was 0.6 or more, from which it was confirmed that the linearity of the fibrous conductive members was ensured. The inclination angle θ of the fibrous conductive members relative to the surface direction of the cathode catalyst layer obtained by using the above-described method was 28°, from which it was confirmed that the fibrous conductive members were not lying down. In the SEM image, it was also confirmed that the fibrous conductive members were not penetrating into the electrolyte membrane and the gas diffusion layer.

Comparative Example 1

A unit cell B1 was produced in the same manner as in Example 1, except that CNTs with an average fiber length of 100 μm were used as fibrous conductive members, and the obtained unit cell was evaluated. The length L of the fibrous conductive members obtained by using the above-described method was 100 μm, and the thickness T of the catalyst layer was 6 μm. From this, L/T was calculated to be 100/6.

The linearity parameter $L_p$ obtained by using the above-described method was less than 0.6, from which it was confirmed that the fibrous conductive members were bent, and thus the inclination angle θ was not obtained. In the SEM image, it was also confirmed that the fibrous conductive members were lying down. The reason that the fibrous conductive members were bent and lying down is considered to be that the length L of the fibrous conductive members was excessively large relative to the thickness T of the catalyst layer. Thus, a reduction in the number of voids and uneven distribution of voids were observed in the cathode catalyst layer.

The evaluation results are shown in Table 1.

TABLE 1

| | Unit cell | L/T | Linearity parameter $L_p$ | Inclination angle θ (°) | Peak output |
|---|---|---|---|---|---|
| Comparative Example 1 | B1 | 100/6 | Less than 0.6 | — | 100 |
| Example 1 | A1 | 15/6 | 0.6 or more | 30 | 108 |
| Example 2 | A2 | 5/6 | 0.6 or more | 45 | 123 |
| Example 3 | A3 | 15/5 | 0.6 or more | 28 | 108 |

The unit cells A1 to A3 of Examples 1 to 3 exhibited peak power densities higher than that of the unit cell B1 of Comparative Example 1 because the gas diffusion properties in the catalyst layer were improved. The unit cell A2 of Example 2 in which L/T was 1 or less exhibited output characteristics even higher than that of the unit cell A1 of Example 1 in which L/T was greater than 1 and 3 or less.

Second Embodiment

A membrane electrode assembly according to a second embodiment of the present disclosure includes an electrolyte membrane and a pair of electrodes that sandwich the electrolyte membrane, each of the pair of electrodes including a catalyst layer and a gas diffusion layer in this order from the electrolyte membrane side. The catalyst layer of at least one of the pair of electrodes contains first fibrous conductive members and catalyst particles, the first fibrous conductive members being inclined relative to the surface direction of the catalyst layer (the surface direction of the electrolyte membrane). The gas diffusion layer of at least one of the pair of electrodes includes a porous layer that contains a conductive material and a polymer resin. One of the pair of electrodes functions as an anode, and the other electrode functions as a cathode. Also, a fuel cell according to an embodiment of the present invention includes a membrane electrode assembly and a pair of separators that sandwich the membrane electrode assembly. Hereinafter, the surface direction of the catalyst layer and the surface direction of the electrolyte membrane will also be referred to as "XY direction". Likewise, the thickness direction of the catalyst layer and the thickness direction of the electrolyte membrane will also be referred to as "Z direction".

The expression "first fibrous conductive members are inclined relative to the XY direction" means that the first fibrous conductive members are neither parallel nor perpendicular to the XY direction. That is, it can be said that the first fibrous conductive members are inclined relative to the XY direction, and also inclined relative to the Z direction.

As a result of the first fibrous conductive members being inclined relative to the XY direction, bending of the first fibrous conductive members and penetration of the first fibrous conductive members into the electrolyte membrane and the like caused by an external force being applied to the membrane electrode assembly (catalyst layer) in the Z direction can be suppressed. Accordingly, a reduction in gas diffusion properties in a portion of the catalyst layer caused by the first fibrous conductive members being bent or penetrating into the electrolyte membrane and the like can be suppressed, and good gas diffusion properties in the entire catalyst layer can be obtained. Furthermore, the possibility of an influence on the conductivity of the first fibrous conductive members caused by bending of the first fibrous conductive members and penetration of the first fibrous conductive members into the electrolyte membrane and the like can also be eliminated. Even without an embedding prevention layer, the embedment of the end portions of the first fibrous conductive members into the electrolyte membrane during transfer of the catalyst layer onto the electrolyte membrane can be suppressed.

The expression "first fibrous conductive members are inclined" means that the first fibrous conductive members are present inclined relative to the XY direction in the catalyst layer, with the linearity of the first fibrous conductive members being ensured. As used herein, the expression "the linearity of the first fibrous conductive members is ensured" means that the first fibrous conductive members are not bent significantly, and linearity parameter $L_p$ (average value), which is determined using a method described below, is 0.6 or more. From the viewpoint of further improving gas diffusion properties, the linearity parameter $L_p$ (average value) is preferably 0.7 or more.

The direction in which the first fibrous conductive members are inclined in the catalyst layer is not particularly limited. A plurality of first fibrous conductive members included in the catalyst layer may be inclined in different directions, or may be inclined unidirectionally.

Each of the gas diffusion layers includes the above-described porous layer, and has good flexibility. Accordingly, with the combined use of the catalyst layer and the gas diffusion layer, the gas diffusion layer can sufficiently conform to the surface of the catalyst layer when disposing the gas diffusion layer on the catalyst layer, which significantly improves the adhesion between the catalyst layer and the gas diffusion layer. As a result, supply of reactive gas from the gas diffusion layer to the catalyst layer and discharge of produced water from the catalyst layer to the gas diffusion layer are performed smoothly. The water is generated by at least one of catalytic reaction and condensation of water vapor in the catalyst layer.

The membrane electrode assembly can be obtained by, for example, sandwiching an electrolyte membrane with each surface having a catalyst layer by a pair of gas diffusion layers to form a stack body; and heat-pressing the stack body. With the combined use of a catalyst layer that contains first fibrous conductive members that are inclined relative to the surface direction of the catalyst layer and a gas diffusion layer with good flexibility, the catalyst layer and the gas diffusion layer can adhere to each other through heat-pressing at a low pressure. With this configuration, bending of the first fibrous conductive members and penetration of the first fibrous conductive members into the gas diffusion layer and the like during production of the membrane electrode assembly can be suppressed, and gas diffusion properties in the catalyst layer can be enhanced.

In the case where the first fibrous conductive members are inclined relative to the surface direction of the catalyst layer, it may be a little disadvantageous in term of water dischargeability from the catalyst layer to the gas diffusion layer depending on the inclination angle of the first fibrous conductive members and the orientation of the first fibrous conductive members in the lengthwise direction when the membrane electrode assembly is viewed from the stack direction. Even in this case, the adhesion between the catalyst layer and the gas diffusion layer is improved significantly, and thus water dischargeability from the catalyst layer to the gas diffusion layer can be sufficiently enhanced.

Good gas diffusion properties in the entire catalyst layer can be obtained, and the adhesion between the catalyst layer and the gas diffusion layer can be improved, as a result of which, the power generation performance (output characteristics, and the like) of the fuel cell can be improved.

(Catalyst Layer)

It is preferable that the length $L_1$ of the first fibrous conductive members and the thickness $T_1$ of the catalyst layer satisfy the relational expression: $L_1/T_1 \leq 3$. If $L_1/T_1$ is 3 or less, first fibrous conductive members that are inclined relative to the XY direction while ensuring an appropriate level of linearity of the first fibrous conductive members can be easily obtained. With this configuration, voids (gas paths) can be sufficiently formed in the catalyst layer, and gas can be effectively diffused in the entire catalyst layer.

From the viewpoint of further improving gas diffusion properties in the catalyst layer, $L_1/T_1$ is preferably 0.25 or more and 2.0 or less, and more preferably 0.25 or more and 1.0 or less. In this case, the first fibrous conductive members can be easily inclined at an inclination angle $\theta$ within a preferred range, which will be described later.

The length $L_1$ of the first fibrous conductive members means average fiber length, and can be determined by arbitrarily extracting 10 first fibrous conductive members from the catalyst layer and averaging the fiber lengths of the first fibrous conductive members. The term "the fiber length of a first fibrous conductive member" refers to the length of a straight line connecting one end and the other end of the first fibrous conductive member.

The length $L_1$ of the first fibrous conductive members is preferably 0.2 µm or more and 20 µm or less, and more preferably 0.5 µm or more and 10 µm or less. In this case, even if a thin catalyst layer (for example, with a thickness $T_1$ of 10 µm or less) is used, the first fibrous conductive members can be easily inclined relative to the XY direction. Also, by using short first fibrous conductive members with a length within the above-described range, opposite ends of the first fibrous conductive members in the catalyst layer respectively coming into contact with the electrolyte membrane and the gas diffusion layer can be suppressed. As a result, the embedment of the end portions of the first fibrous conductive members into the electrolyte membrane during transfer of the catalyst layer onto the electrolyte membrane is further suppressed. Also, the penetration of the first fibrous conductive members into the electrolyte membrane and the like in the event of an external force being applied to the membrane electrode assembly in the Z direction is further suppressed.

The thickness $T_1$ of the catalyst layer means average thickness, and can be determined by measuring the distance of a straight line connecting one main surface to the other main surface of the catalyst layer in the thickness direction of the catalyst layer at arbitrarily selected 10 points in a cross section of the catalyst layer, and averaging the obtained distances.

From the viewpoint of size reduction of the fuel cell, it is desirable that the thickness $T_1$ of the catalyst layer is small. On the other hand, from the viewpoint of strength, it is preferable that the thickness $T_1$ of the catalyst layer is not too small. The thickness T of the catalyst layer is, for example, 1 µm or more and 50 µm or less, and preferably 2 µm or more and 20 µm or less.

The inclination angle $\theta$ of the first fibrous conductive members relative to the XY direction is preferably 80° or less, and more preferably 70° or less. If the inclination angle $\theta$ is 80° or less, gas diffusion properties in the XY direction are further improved in addition to gas diffusion properties in the Z direction. If the inclination angle $\theta$ is 70° or less, bending of the first fibrous conductive members and penetration of the first fibrous conductive members into the electrolyte membrane and the like caused by an external force being applied to the membrane electrode assembly in the Z direction can be further suppressed.

Also, the inclination angle $\theta$ of the first fibrous conductive members relative to the XY direction is preferably 25° or more. If the inclination angle $\theta$ is 25° or more, the gas diffusion properties in the Z direction are further improved in addition to the gas diffusion properties in the XY direction.

More preferably, the inclination angle $\theta$ is 25° or more and 65° or less.

Figure 5:
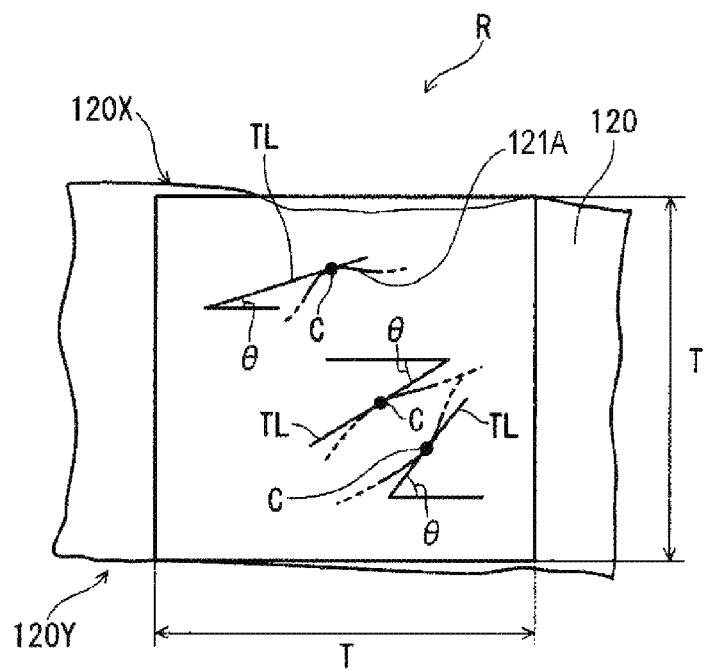
FIG. 5 is an illustrative diagram illustrating a method for calculating linearity parameter L of first fibrous conductive members and a method for calculating inclination angle θ of the first fibrous conductive members, using a cross section of a catalyst layer.

The linearity parameter $L_p$ and the inclination angle $\theta$ of the first fibrous conductive members are determined in the manner described below by using FIG. 5. FIG. 5 is an illustrative diagram illustrating a method for calculating linearity parameter L of first fibrous conductive members and a method for calculating inclination angle $\theta$ of the first fibrous conductive members, using a cross section of a catalyst layer 120. FIG. 5 shows only a few first fibrous conductive members 121A.

First, an image of a cross section of a catalyst layer 120 taken along the thickness direction of the catalyst layer 120 is captured using a scanning electron microscope (SEM). The catalyst layer 120 contains first fibrous conductive members 121A and catalyst particles (not shown), and has a first main surface 120X on the gas diffusion layer side and a second main surface 120Y on the electrolyte membrane side.

In an obtained SEM image, for example, a square region (hereinafter referred to as "designated region R") is defined, the square region being a square region in which, for example, 20 or more first fibrous conductive members 121A can be observed and that has each side having a length corresponding to the thickness T of the catalyst layer 120. The designated region R can be defined in the manner described below. First, a straight line is drawn along the thickness direction of the catalyst layer 120. A point of intersection of the straight line with the second main surface 120Y is taken as one of the vertices of a square that will be the designated region R. Next, two straight lines that each have a length T and are perpendicular to each other are drawn from this vertex, and other two straight lines are drawn so as to form a square together with the two straight lines drawn earlier.

Next, 10 first fibrous conductive members are arbitrarily selected from among the first fibrous conductive members 121A that can be observed in the designated region R. For each of the 10 first fibrous conductive members 121A, one end and the other end of an observable lengthwise portion are connected by a straight line, and the length $L_s$ of the straight line is obtained. Also, the actual length $L_r$ of the observable lengthwise portion is obtained. The ratio of $L_s$ relative to 4 ($L_s/L_r$) is defined as linearity parameter $L_p$.

In the manner as described above, three designated regions R are defined such that they do not overlap each other. Then, for each of the three designated regions R, the linearity parameters $L_p$ of 10 first fibrous conductive members 121A are obtained, and the average value of the linearity parameters $L_p$ of a total of 30 first fibrous conductive members 121A is obtained. If the linearity parameter $L_p$ (average value) is 0.6 or more, it is determined that the linearity of the first fibrous conductive members 121A is ensured. On the other hand, if the linearity parameter $L_p$ (average value) is less than 0.6, it is determined that the first fibrous conductive members 121A are bent, and inclination angle θ, which will be described later, cannot be obtained.

After it has been confirmed from the above-described linearity parameter that the linearity of the fibrous conductive members is ensured, the inclination angle θ of the first fibrous conductive members is determined in the manner described below by using a diagram.

For each of the 10 first fibrous conductive members 121A arbitrarily selected in each of the three designated regions R, a tangent line TL is drawn at the midpoint C of an observable lengthwise portion. The angle (90° or less) formed by the tangent line TL and the first main surface 120X is defined as the inclination angle θ of the first fibrous conductive member 121A, and the average value of the inclination angles θ of a total of 30 first fibrous conductive members 121A is determined. If the first main surface 120X has irregularities, a surface perpendicular to the thickness direction of the catalyst layer 120 or the smooth second main surface 120Y may be used as a reference for determining the inclination angle θ.

The diameter $D_1$ of the first fibrous conductive members is preferably 200 nm or less, more preferably 5 nm or more and 200 nm or less, and even more preferably 8 nm or more and 100 nm or less. In this case, the volume ratio of the first fibrous conductive members in the catalyst layer can be reduced, the gas paths can be sufficiently ensured, and the gas diffusion properties can be further enhanced.

The diameter $D_1$ of the first fibrous conductive members can be determined by arbitrarily selecting 10 first fibrous conductive members from among the first fibrous conductive members in the catalyst layer and averaging the diameters of the 10 first fibrous conductive members. The term "diameter" refers to the length of a first fibrous conductive member in a direction perpendicular to the lengthwise direction of the first fibrous conductive member.

It is preferable that the length $L_1$ of the first fibrous conductive members and the diameter $D_1$ of the first fibrous conductive members satisfy the relational expression: $D_1/L_1<1$. In this case, good gas diffusion properties in the entire catalyst layer can be obtained sufficiently.

From the viewpoint of improving conductivity, it is more preferable that $D_1/L_1$ is 0.002 or more and less than 1.

From the viewpoint of improving gas diffusion properties in the catalyst layer, it is preferable that the BET specific surface area of the first fibrous conductive members is 50 $m^2/g$ or more. In this case, a predetermined spacing or more can be ensured between catalyst particles that are present on each first fibrous conductive member, and thus gas diffusion properties around the catalyst particles can be ensured.

The BET specific surface area of the first fibrous conductive members is obtained in the manner described below.

From a sample obtained by cutting out a portion from a produced catalyst layer, the catalyst particles and the proton conductive resin are removed, and the first fibrous conductive members are extracted. The specific surface area of the fibrous conductive members is determined based on a BET method that is an ordinary method for measuring specific surface area, using a specific surface area measurement apparatus by a gas adsorption method.

Examples of the first fibrous conductive members include carbon fibers such as vapor grown carbon fibers (VGCFs), carbon nanotubes (CNTs), and carbon nanofibers.

At least some of the catalyst particles are supported by the first fibrous conductive members. It is preferable that the catalyst particles are also supported by particulate conductive members, which will be described later, in addition to the first fibrous conductive members. The reason is that the catalyst particles can more easily come into contact with the gas, which increases the efficiency of oxidation reaction or reduction reaction of the gas.

The catalyst particles are not particularly limited, and may be made of a catalyst metal such as an alloy or a metal element selected from Sc, Y, Ti, Zr, V, Nb, Fe, Co, Ni, Ru, Rh, Pd, Pt, Os, Ir, lanthanoid-series elements, and actinoid-series elements. For example, the catalyst particles used in the anode may be made of Pt, a Pt—Ru alloy, or the like. The catalyst metal used in the cathode may be Pt, a Pt—Co alloy, or the like.

From the viewpoint of shortening the conductive path and further enhancing conductivity, it is preferable that the catalyst layer further contains particulate conductive members. The material of the particulate conductive members is not particularly limited, and it is preferable to use carbon black because it has excellent conductivity. Examples of carbon black include acetylene black, Ketjen black, thermal black, furnace black, channel black, and the like. The particle size (or the length of a structure composed of a plurality of connected primary particles) is not particularly limited, and any particle size that is conventionally used in a catalyst layer for a fuel cell can be used.

The amount of the particulate conductive members in the catalyst layer is preferably 40 parts by mass or less relative to 100 parts by mass of a total of the first fibrous conductive members and the particulate conductive members, more preferably 5 parts by mass or more and 35 parts by mass or less, and even more preferably 10 parts by mass or more and 30 parts by mass or less. In this case, conductivity can be enhanced while ensuring good gas diffusion properties in the entire catalyst layer.

From the viewpoint of improving reactivity in the catalyst layer, it is preferable that the catalyst layer further contains a proton conductive resin. In this case, the proton conductive resin covers at least some of the first fibrous conductive members and the catalyst particles. Because the first fibrous conductive members are inclined relative to the XY direction, an influence on the reactivity (proton conductivity) in the catalyst layer caused by the first fibrous conductive members being bent due to an external force being applied to the membrane electrode assembly in the Z direction can be suppressed.

The proton conductive resin is not particularly limited, and examples include a perfluorocarbon sulfonic acid-based polymer, a hydrocarbon-based polymer, and the like. Among these, it is preferable to use a perfluorocarbon sulfonic acid-based polymer or the like because it has excellent thermal resistance and chemical stability. As the perfluorocarbon sulfonic acid-based polymer, for example, Nafion® can be used. The proton conductive resin may also cover at least some of the particulate conductive members.

The amount of the first fibrous conductive members in the catalyst layer is preferably 15 parts by mass or more and 65 parts by mass or less relative to 100 parts by mass of a total of the catalyst particles, the particulate carbon material and the proton conductive resin, and more preferably 20 parts by mass or more and 55 parts by mass or less. The reason is that, within this range, the first fibrous conductive members can be easily brought into a desired state, and gas diffusion properties and the efficiency of electrochemical reaction can be easily increased.

The porosity $P_1$ of the catalyst layer is preferably 30% or more and 70% or less, and more preferably 40% or more and 65% or less. In this case, both gas diffusion properties and water dischargeability in the catalyst layer can be increased.

The porosity $P_1$ of the catalyst layer is obtained in the manner described below.

An image of a cross section of the catalyst layer is captured using a scanning electro microscope (SEM). The obtained image is subjected to image processing (binary processing) so as to distinguish voids from portions other than the voids. In the processed image, a region with a predetermined area $A_1$ is arbitrarily selected, and the area $A_{p1}$ of voids in the region is determined. Then, the ratio (%) of the area $A_{p1}$ of voids relative to the area $A_1$ of the region is calculated and defined as porosity $P_1$. The porosity $P_1$ may also be obtained by determining the porosity of each of a plurality of regions and averaging the plurality of obtained porosities.

(Formation of Catalyst Layer)

The catalyst layer can be formed by, for example, applying a catalyst ink containing first fibrous conductive members and catalyst particles onto the surface of an electrolyte membrane and drying the catalyst ink. Alternatively, the catalyst ink may be applied to a transfer substrate sheet and dried to form a catalyst layer, and the catalyst layer formed on the substrate sheet may be transferred onto an electrolyte membrane. As the substrate sheet, it is preferable to use, for example, a sheet with a smooth surface made of polyethylene terephthalate (PET), polypropylene or the like.

The catalyst ink contains a dispersion medium in addition to the first fibrous conductive members and the catalyst particles. As the dispersion medium, for example, water, ethanol, propanol, and the like can be used. The catalyst ink may further contain particulate conductive members, a proton conductive resin, and the like.

As the application method, for example, a spray method, a screen printing method, and a coating method that uses any type of coater such as a blade coater, a knife coater, or a gravure coater can be used. In the case where a coater is used, the direction in which the first fibrous conductive members are inclined can be easily controlled.

From the viewpoint of easily obtaining the first fibrous conductive members that are inclined relative to the XY direction, when forming the catalyst layer by applying the catalyst ink, it is preferable to adjust the length of the first fibrous conductive members and the thickness of the catalyst layer such that $L_1/T_1$ satisfies 3 or less. The length of the first fibrous conductive members can be adjusted by selecting the length of the material used for making the first fibrous conductive members as appropriate. The thickness of the catalyst layer can be adjusted by changing the application amount of the catalyst ink or the like.

The inclination angle θ of the first fibrous conductive members can be adjusted by changing, for example, the composition, viscosity, application amount, application rate, drying rate, and the like of the catalyst ink.

(Gas Diffusion Layer)

The gas diffusion layer includes a porous layer that contains a conductive material and a polymer resin as main components. The porous layer contains a mixture of a conductive material and a polymer resin. The porous layer (conductive material) does not include a sheet-like porous substrate such as a woven fabric or a non-woven fabric of carbon fibers, specifically, a carbon cloth, carbon paper or the like, or a porous metal sheet such as a metal mesh or an expanded metal. From the viewpoint of ensuring gas diffusion properties and conductivity, the amount of the conductive material in the gas diffusion layer (porous layer) is preferably 50 mass % or more and 90 mass % or less.

Examples of the conductive material include a fibrous material (second fibrous conductive members), a particulate material, and a plate-like material. Among these, it is preferable that the conductive material contains second fibrous conductive members. As a result of voids formed from the second fibrous conductive members in the gas diffusion layer communicating with voids formed from the first fibrous conductive members in the catalyst layer, produced water is efficiently discharged from the catalyst layer to the gas diffusion layer. As the second fibrous conductive members, the materials as those listed for the first fibrous conductive members can be used. The proportion of second fibrous conductive members to the total amount of the conductive material is preferably 10 mass % or more and 80 mass % or less, and more preferably 20 mass % or more and 75 mass % or less.

From the viewpoint of improving the dischargeability of produced water from the catalyst layer to the gas diffusion layer, $L_2/L_1$ that is the ratio of the length $L_2$ of the second fibrous conductive members relative to the length $L_1$ of the first fibrous conductive members is preferably 0.5 or more, more preferably 1.0 or more, and even more preferably greater than 1.0. Also, $L_2/L_1$ is preferably 200 or less, and more preferably 10 or less.

The length $L_2$ of the second fibrous conductive members means average fiber length, and can be determined by arbitrarily extracting 10 second fibrous conductive members from the gas diffusion layer and averaging the fiber lengths of the second fibrous conductive members. The term "the fiber length of a second fibrous conductive member" refers to the length of a straight line connecting one end and the other end of the second fibrous conductive member.

The length $L_2$ of the second fibrous conductive members is preferably 0.5 μm or more and 100 μm or less, and more preferably 1.0 μm or more and 20 μm or less. In this case, a thin gas diffusion layer (for example, with a thickness $T_2$ of 150 μm or less) can be easily formed, and it is therefore advantageous in achieving a reduction in the size of the fuel cell. Also, the voids formed among the second fibrous conductive members in the gas diffusion layer can easily communicate with the voids formed among the first fibrous conductive members in the catalyst layer, and thus produced water is efficiently discharged from the catalyst layer to the gas diffusion layer.

Because produced water is efficiently discharged from the catalyst layer to the gas diffusion layer, $D_2/D_1$ that is the ratio of the diameter $D_2$ of the second fibrous conductive members relative to the diameter $D_1$ of the first fibrous conductive members is preferably 0.5 or more, more preferably 1.0 or more, and even more preferably greater than 1.0. Also, $D_2/D_1$ is preferably 30 or less, and more preferably 20 or less.

The diameter $D_2$ of the second fibrous conductive members can be determined by arbitrarily extracting 10 second fibrous conductive members from the gas diffusion layer and averaging the diameters of the second fibrous conductive members. The term "diameter" refers to the length of a second fibrous conductive member in a direction perpendicular to the lengthwise direction of the second fibrous conductive member.

The diameter $D_2$ of the second fibrous conductive members is preferably 200 nm or less, and more preferably 10 nm or more and 180 nm or less. In this case, the volume ratio of the second fibrous conductive members in the gas diffusion layer can be reduced, the gas paths can be sufficiently ensured, and the gas diffusion properties can be further enhanced.

The particulate material is microscopically in the form of spherical particles or shapeless particles. However, normally, a spherical particle is present not in the form of a perfect sphere with no directivity, and thus has a major axis and a minor axis. The longest length (major axis) $L_a$ of a spherical particle or a shapeless particle and the longest length (minor axis) $W_a$ that is perpendicular to the longest length (major axis) satisfy $L_a \geq W_a$. The aspect ratio $L_a/W_a$ of the particulate material preferably satisfies $1 \leq L_a/W_a \leq 5$, and more preferably $1 \leq L_a/W_a < 2$.

Examples of the particulate material include carbon black, spherical graphite, active carbon, and the like. Among these, it is preferable to use carbon black because it is highly conductive and has a large pore volume. As the carbon black, acetylene black, Ketjen black, furnace black, and the like can be used.

The plate-like material is macroscopically in the form of particles, but microscopically in the form of plate-like particles. Where the smallest height (thickness) of a plate-like particle is represented by $T_b$, the longest length (major axis) $L_b$ of the plate-like particle as viewed from a direction parallel to the direction of the thickness T and the longest length (minor axis) $W_b$ that is perpendicular to the longest length (major axis) satisfy $L_b \geq W_b$, and $T_b$ is sufficiently smaller than $W_b$. $L_b/T_b$ that is the aspect ratio of the plate-like material preferably satisfies $10 < L_b/T_b$, and more preferably $20 \leq L_b/T_b$.

Specific examples of the plate-like material include flake graphite, a pulverized product of a graphitized polyimide film, graphene, and the like. Among these, it is advantageous to use a pulverized product of a graphitized polyimide film and graphene in that the particles can be easily oriented in the surface direction of the gas diffusion layer, and a thin gas diffusion layer can be formed.

The polymer resin functions as a binder for binding the conductive members of the conductive material. From the viewpoint of suppressing accumulation of water in the pores of the gas diffusion layer, a water repellent fluorocarbon resin preferably accounts for 50 mass % or more of the polymer resin, and more preferably 90 mass % or more. Examples of fluorocarbon resin include PTFE (polytetrafluoroethylene), FEP (tetrafluoroethylene-hexafluoropropylene copolymer), PVdF (polyvinylidene fluoride), ETFE (tetrafluoroethylene-ethylene copolymer), PCTFE (polychlorotrifluoroethylene), PFA (polytetrafluoroethylene-perfluoroalkyl vinyl ether copolymer), and the like. Among these, it is preferable that fluorocarbon resin is PTFE from the viewpoint of thermal resistance, water repellency, and chemical resistance.

The amount of the polymer resin is preferably 2 parts by mass or more and 70 parts by mass or less relative to 100 parts by mass of the conductive material contained in the gas diffusion layer, and more preferably 10 parts by mass or more and 60 parts by mass or less.

$T_2/T_1$ that is the ratio of the thickness $T_2$ of the gas diffusion layer relative to the thickness $T_1$ of the catalyst layer is preferably 1.0 or more and 75 or less, and more preferably 1.5 or more and 50 or less. In this case, supply of reactive gas from the gas diffusion layer to the catalyst layer and discharge of produced water from the catalyst layer to the gas diffusion layer are efficiently performed.

The thickness $T_2$ of the gas diffusion layer is preferably 60 μm or less, more preferably 150 μm or less, and even more preferably 30 μm or more and 150 μm or less. If the average thickness of the gas diffusion layer designed as described above is too large, the path length for diffusing gas in the thickness direction increases, which makes it difficult to improve power generation performance. If the thickness of the gas diffusion layer is 30 μm or more, the path length for diffusing gas in the thickness direction and the path length for diffusing gas in the surface direction can be ensured with a good balance.

In the case where the first main surface of the gas diffusion layer and the second main surface of the gas diffusion layer that is on the opposite side of the first main surface are visually flat without having irregularities formed by cutting or press processing, the thickness $T_2$ of the gas diffusion layer can be determined by measuring the thickness of the gas diffusion layer at arbitrarily selected 10 points, and averaging the obtained thicknesses. On the other hand, in the case where the gas diffusion layer has a pattern with irregularities, the maximum thickness and the minimum thickness of the gas diffusion layer are determined, which are multiplied by the area ratio and added. The maximum thickness of the gas diffusion layer is obtained as the average value of the thicknesses of arbitrarily selected 10 convexes that are thickest portions, and the minimum thickness of the gas diffusion layer is obtained as the average value of the thicknesses of arbitrarily selected 10 concaves that are thinnest portions. If the thickness $T_2$ of the gas diffusion layer is 150 μm or less, or 100 μm or less, it is preferable that the two main surfaces of the gas diffusion layer are visually flat without having irregularities as described above.

From the viewpoint of gas diffusion properties and water dischargeability, the porosity $P_2$ of the gas diffusion layer is preferably 60% or more and 90% or less, and more preferably 65% or more and 88% or less.

From the viewpoint of efficiently supplying reactive gas from the gas diffusion layer to the catalyst layer and discharging produced water from the catalyst layer to the gas diffusion layer, $P_2/P_1$ that is the ratio of the porosity $P_2$ of the gas diffusion layer relative to the porosity $P_1$ of the catalyst layer is, for example, 0.7 or more, and preferably greater than 1. If $P_2/P_1$ is greater than 1, water dischargeability can be further enhanced. Also, $P_2/P_1$ is, for example, 3.0 or less.

The porosity $P_2$ of the gas diffusion layer is obtained in the manner described below.

An image of a cross section of the gas diffusion layer is captured using a scanning electron microscope (SEM). The obtained image is subjected to image processing (binary processing) so as to distinguish voids from portions other than the voids. In the processed image, a region with a predetermined area $A_2$ is arbitrarily selected, and the area $A_{p2}$ of voids in the region is determined. Then, the ratio (%) of the area $A_{p2}$ of voids relative to the area $A_2$ of the region is calculated and defined as porosity $P_2$. The porosity $P_2$ may also be obtained by determining the porosity of each of a plurality of regions and averaging the plurality of obtained porosities.

(Formation of Gas Diffusion Layer)

The step of forming a porous layer used to form the gas diffusion layer includes: for example, a first step of preparing a mixture that contains a conductive material, a polymer resin, a surfactant and a dispersion medium; a second step of molding the mixture into a sheet; a third step of sintering the molded sheet; and a fourth step of rolling the sintered sheet.

In the first step, a kneader or a mixer may be used as a mixing apparatus. At this time, it is preferable to introduce a conductive material, a surfactant and a dispersion medium into the mixing apparatus, uniformly disperse the conductive material in the dispersion medium, then add a polymer resin to the mixture, and disperse the polymer resin in the mixture. It is preferable to apply an appropriate shearing force to the polymer resin so as to form the polymer resin into fibrils. Examples of the dispersion medium include water, alcohol, and glycol. Examples of the surfactant include polyoxyethylene alkyl ether, alkylamine oxide, and the like.

In the second step, the mixture is, for example, extrusion-molded. The obtained molded sheet may be further rolled. A roll pressing machine can be used to roll the sheet. The conditions for roll pressing are not particularly limited, and a gas diffusion layer with a high strength can be easily obtained by rolling at a line pressure of 0.001 ton/cm to 4 ton/cm.

In the third step, the sheet is sintered to remove the surfactant and the dispersion medium. The sintering temperature may be set to a temperature at which the polymer resin does not degrade, and the surfactant and the dispersion medium decompose or evaporate. In the case where PTFE is used as the polymer resin, the sintering temperature is preferably set to 310 to 340° C. It is sufficient that the sintering atmosphere is an inert atmosphere, and the sintering atmosphere is preferably, for example, a nitrogen atmosphere, an argon atmosphere, or a reduced pressure atmosphere. It is unnecessary to completely remove the surfactant and the dispersion medium from the sheet, and it is sufficient that most of the surfactant and the dispersion medium are removed from the sheet.

In the fourth step, the sintered sheet is rolled to adjust the thickness of the sintered sheet. Also, in a rolling die used to roll the sintered sheet ribs may be formed in a predetermined gas flow path pattern such that a groove that serves as a gas flow path is formed on at least one of two main surfaces of the sintered sheet. Also, the method for forming a gas flow path is not limited to press processing as described above, and a gas flow path may be formed by subjecting the main surface of the rolled sheet to cut processing or the like.

Figure 6:
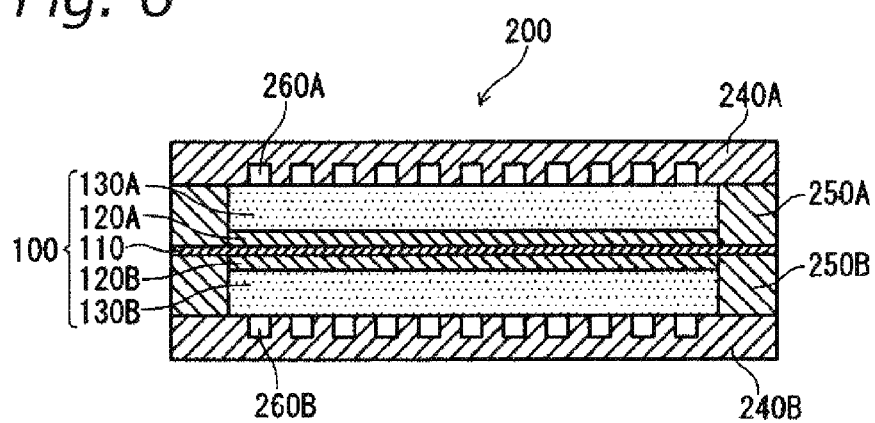
FIG. 6 is a cross sectional view schematically showing the structure of a unit cell included in a fuel cell according to a second embodiment of the present disclosure.

Hereinafter, an example of the structure of a fuel cell according to the present embodiment will be described with reference to FIG. 6. FIG. 6 is across sectional view schematically showing the structure of a unit cell provided in the fuel cell according to the embodiment of the present invention. Ordinarily, a plurality of unit cells are stacked and provided in a fuel cell as a cell stack. For the sake of convenience, FIG. 6 shows only one unit cell.

A unit cell provided in a fuel cell 200 includes a membrane electrode assembly 100 that includes: an electrolyte membrane 110; a first catalyst layer 120A and a second catalyst layer 120B that are disposed to sandwich the electrolyte membrane 110; and a first gas diffusion layer 130A and a second gas diffusion layer 130B that are disposed to sandwich the electrolyte membrane 110 via the first catalyst layer 120A and the second catalyst layer 120B, respectively. The unit cell of the fuel cell 200 also includes a first separator 240A and a second separator 240B that sandwich the membrane electrode assembly 100. One of the first catalyst layer 120A and the second catalyst layer 120B functions as an anode, and the other catalyst layer functions as a cathode. The electrolyte membrane 110 is larger in size than the first catalyst layer 120A and the second catalyst layer 120B, and thus the peripheral portion of the electrolyte membrane 110 extends beyond the first catalyst layer 120A and the second catalyst layer 120B. The peripheral portion of the electrolyte membrane 110 is sandwiched by a pair of sealing members 250A and 250B.

Figure 7:
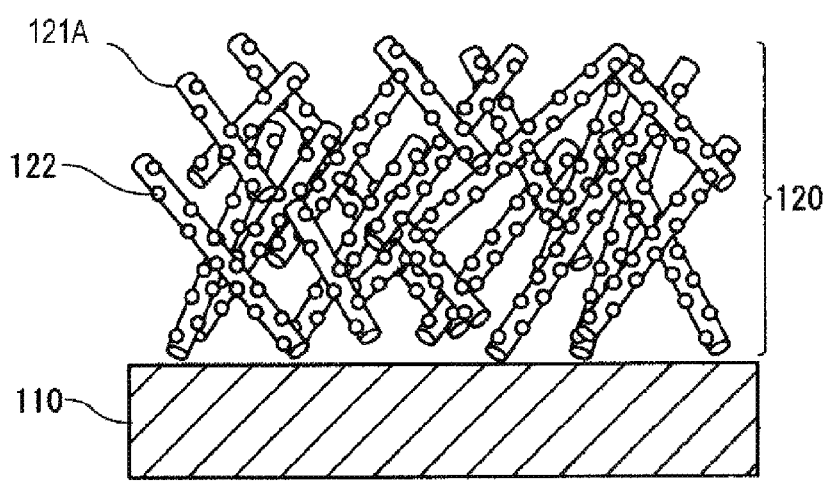
FIG. 7 is a diagram schematically showing the inside of a catalyst layer according to the second embodiment of the present disclosure.

At least one of the first catalyst layer 120A and the second catalyst layer 120B is a catalyst layer 120 shown in FIG. 7. FIG. 7 is a diagram schematically showing the inside of the catalyst layer, as viewed in the surface direction. In order to show that fibrous conductive members are inclined, for the sake of convenience, an electrolyte membrane 110 is also illustrated. As shown in FIG. 7, the catalyst layer 120 includes first fibrous conductive members 121A and catalyst particles 122. The first fibrous conductive members 121A are inclined relative to the surface direction (XY direction) of the electrolyte membrane 110. If the other one of the first catalyst layer 120A and the second catalyst layer 120B is not the above-described catalyst layer 120, a catalyst layer of a known material and a known configuration can be used.

At least one of the first gas diffusion layer 130A and the second gas diffusion layer 130B includes the above-described porous layer. In the case where the first gas diffusion layer 130A or the second gas diffusion layer 130B does not include the porous layer, a gas diffusion layer of a known material and a known configuration can be used.

As the electrolyte membrane 110, a polymer electrolyte membrane is preferably used. As the material of the polymer electrolyte membrane, the polymer electrolytes listed as examples of the proton conductive resin can be used. The thickness of the electrolyte membrane 110 is, for example, 5 to 30 μm.

It is sufficient that the first separator 240A and the second separator 240B are gas-tight, electron conductive and electrochemically stable, and the material of the first separator 240A and the second separator 240B is not particularly limited. As the material, it is preferable to use a carbon material, a metal material, and the like. The metal material ma be covered by carbon. For example, each of the first separator 240A and the second separator 240B can be obtained by, for example, punching out a metal plate into a predetermined shape and performing a surface treatment on the obtained metal plate.

In the present embodiment, a gas flow path 260A is formed on a surface of the first separator 240A to be in contact with the first gas diffusion layer 130A. On the other hand, on a surface of the second separator 240B to be in contact with the second gas diffusion layer 130B, a gas flow path 260B is formed. The shape of the gas flow paths is not particularly limited, and may be parallel, serpentine, straight, or the like.

The sealing members 250A and 250B are made of an elastic material, and are provided to prevent a fuel and/or an oxidant from leaking out of the gas flow paths 260A and 260B. The sealing members 250A and 250B have, for example, frame-like shapes that respectively surround the peripheral portion of the first catalyst layer 120A and the peripheral portion of the second catalyst layer 120B in the shape of a loop. As the sealing members 250A and 250B, a known material and a known configuration can be used.

INDUSTRIAL APPLICABILITY

The fuel cell according to the present disclosure is suitable for use in a power supply for a stationary home cogeneration system, or a vehicle power supply. The invention according to the present disclosure is suitable for use in a polymer electrolyte fuel cell, but the application is not limited thereto. The invention according to the present disclosure is applicable to fuel cells in general.

REFERENCE SIGNS LIST

100 Membrane Electrode Assembly
110 Electrolyte Membrane
120 Catalyst Layer
120A First Catalyst Layer
120B Second Catalyst Layer
120X First Main Surface
120Y Second Main Surface 121 Fibrous Conductive Member
121A First Fibrous Conductive Member
122 Catalyst Particle
122A First Particle
122B Core Portion
122C Shell Portion
130A First Gas Diffusion Layer
130B Second Gas Diffusion Layer
200 Fuel Cell
240A First Separator
240B Second Separator
250A, 250B Sealing Member
260A, 260B Gas Flow Path

The invention claimed is:

1. A catalyst layer for a fuel cell comprising:
fibrous conductive members;
particulate conductive members; and
catalyst particles,
wherein a length L of the fibrous conductive members and a thickness T of the catalyst layer for a fuel cell satisfy the following relational expression:

$$L/T \leq 3,$$

an amount of the particulate conductive members is equal to or less than 40 parts by mass relative to 100 parts by mass of a total of the fibrous conductive members and the particulate conductive members, and
the fibrous conductive members are inclined relative to a surface direction of the catalyst layer for a fuel cell.

2. The catalyst layer for a fuel cell in accordance with claim 1,
wherein an inclination angle θ of the fibrous conductive members relative to the surface direction of the catalyst layer for a fuel cell is 80° or less.

3. The catalyst layer for a fuel cell in accordance with claim 1,
wherein the length L of the fibrous conductive members and a diameter D of the fibrous conductive members satisfy the following relational expression:

$$D/L < 1.$$

4. The catalyst layer for a fuel cell in accordance with claim 1,
wherein the fibrous conductive members have a diameter D of 200 nm or less.

5. The catalyst layer for a fuel cell in accordance with claim 1,
wherein the fibrous conductive members have a BET specific surface area of 50 m²/g or more.

6. A fuel cell comprising:
a membrane electrode assembly including an electrolyte membrane and a pair of electrodes that sandwich the electrolyte membrane,
wherein at least one of the pair of electrodes includes the catalyst layer in accordance with claim 1.

7. The catalyst layer for a fuel cell in accordance with claim 1,
wherein the length L of the fibrous conductive members and the thickness T of the catalyst layer satisfy the following relational expression: 0.25≤L/T≤2.0.

8. The catalyst layer for a fuel cell in accordance with claim 1,
wherein the amount of the particulate conductive members is equal to or more than 5 parts by mass and equal to or less than 40 parts by mass relative to 100 parts by mass of the total of the fibrous conductive members and the particulate conductive members.

9. The catalyst layer for a fuel cell in accordance with claim 1, wherein the thickness of the catalyst layer is 2 to 20 μm.

10. A membrane electrode assembly comprising:
an electrolyte membrane; and
a pair of electrodes that sandwich the electrolyte membrane,
wherein each of the pair of electrodes includes a catalyst layer and a gas diffusion layer in this order from the electrolyte membrane side,
the catalyst layer of the at least one of the pair of electrodes includes first fibrous conductive members, particulate conductive members, and catalyst particles,
a length $L_1$ of the first fibrous conductive members and a thickness $T_1$ of the catalyst layer satisfy the following relational expression:

$$L_1/T_1 \leq 3,$$

an amount of the particulate conductive members is equal to or less than 40 parts by mass relative to 100 parts by mass of a total of the first fibrous conductive members and the particulate conductive members,
the first fibrous conductive members are inclined relative to a surface direction of the catalyst layer, and
the gas diffusion layer of the at least one of the pair of electrodes includes a porous layer that contains a conductive material and a polymer resin.

11. The membrane electrode assembly in accordance with claim 10,
wherein the gas diffusion layer has a thickness two times or more of the thickness of the catalyst layer.

12. The membrane electrode assembly in accordance with claim 10,
wherein the gas diffusion layer has a thickness of 600 μm or less.

13. The membrane electrode assembly in accordance with claim 10,
wherein the conductive material contains second fibrous conductive members.

14. The membrane electrode assembly in accordance with claim 13,
wherein the second fibrous conductive members have a length larger than the length of the first fibrous conductive members.

15. The membrane electrode assembly in accordance with claim 13,
wherein the second fibrous conductive members have a diameter larger than that of the first fibrous conductive members.

16. The membrane electrode assembly in accordance with claim 10,
wherein the catalyst layer has a porosity $P_1$ of 30% or more and 70% or less, and
the gas diffusion layer has a porosity $P_2$ of 60% or more and 90% or less.

17. The membrane electrode assembly in accordance with claim 16,
wherein the porosity $P_1$ of the catalyst layer and the porosity $P_2$ of the gas diffusion layer satisfy the following relationship:

$$P_1 < P_2.$$

18. A fuel cell comprising:
the membrane electrode assembly in accordance with claim 10; and
a pair of separators that sandwich the membrane electrode assembly.

19. The membrane electrode assembly in accordance with claim 10,
wherein the length $L_1$ of the first fibrous conductive members and the thickness $T_1$ of the catalyst layer satisfy the following relational expression: $0.25 \leq L_1/T_1 \leq 2.0$.

20. The membrane electrode assembly in accordance with claim 10, wherein the thickness of the catalyst layer is 2 to 20 μm.

* * * * *